United States Patent

Kawase

Patent Number: 5,777,274
Date of Patent: Jul. 7, 1998

[54] GROMMET HAVING AN IDENTIFYING PORTION FOR CHECKING THE GROMMET

[75] Inventor: Kiyotaka Kawase, Yokkaichi, Japan

[73] Assignee: Sumitomo Wiring Systems, Ltd., Japan

[21] Appl. No.: 618,063

[22] Filed: Mar. 25, 1996

[30] Foreign Application Priority Data

Mar. 28, 1995 [JP] Japan .................................. 7-069871

[51] Int. Cl.$^6$ ........................................ H01B 17/26
[52] U.S. Cl. ...................... 174/153 G; 16/2.1; 277/178; 248/56; 29/407.01
[58] Field of Search .......................... 174/151, 152 G, 174/153 G, 65 G, 72 A; 248/56; 277/178; 29/407.01; 16/2.1

[56] References Cited

U.S. PATENT DOCUMENTS

| | | | |
|---|---|---|---|
| 3,857,136 | 12/1974 | Dean | 174/152 R |
| 4,959,509 | 9/1990 | Takeuchi et al. | 174/153 G |
| 5,453,579 | 9/1995 | Cohea | 174/153 G |
| 5,504,973 | 4/1996 | Kameyama | 16/2.1 |

FOREIGN PATENT DOCUMENTS

| | | |
|---|---|---|
| 0 580 130 A1 | 1/1994 | European Pat. Off. . |
| 0 595 687 A1 | 5/1994 | European Pat. Off. . |
| 42 43 557 A1 | 6/1994 | Germany . |
| 57 171 164 | 10/1982 | Japan . |
| 880376 | 10/1961 | United Kingdom ............ 174/151 |

*Primary Examiner*—Kristine L. Kincaid
*Assistant Examiner*—Kamand Cuneo
*Attorney, Agent, or Firm*—Anthony J. Casella; Gerald E. Hespos; Ludomir A. Budzyn

[57] ABSTRACT

A grommet 11 includes a vehicle body mount portion 11a to be mounted on a panel of a vehicle body and a wire insertion portion 11b to be mounted on a wiring harness. A checking projection 11c is formed in a desired position on an outer surface of the vehicle body mount portion 11b of the grommet. The grommet 11 may be used with a checking device 10 formed with a grommet receptacle 10b and a checking recess 10e in which the checking projection 11c is to be fitted for checking whether the grommet is of a specified shape.

3 Claims, 8 Drawing Sheets

GROMMET HAVING AN IDENTIFYING PORTION FOR CHECKING THE GROMMET

BACKGROUND OF THE INVENTION

1. Field of the Invention

The present invention relates to a grommet and a grommet checking apparatus. Particularly, the present invention is designed to accurately check whether or not a grommet of specified shape is mounted on a wiring harness.

2. Description of the Prior Art

Figure 13:
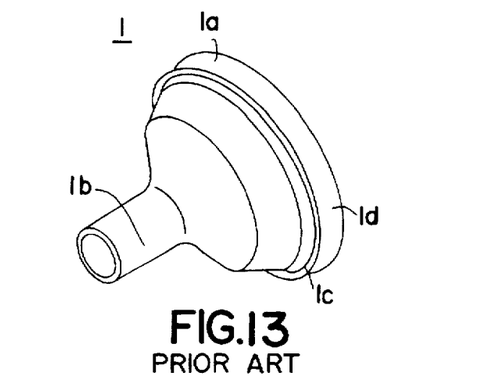
FIG. 13 is a perspective view of a prior art grommet.

When a wiring harness is mounted in a vehicle through a through hole formed in a panel of a vehicle body or the like, a grommet 1 of rubber shown in FIG. 13 is fitted in the through hole with the wiring harness inserted through the grommet 1 for waterproof, dustproof and soundproof purposes. The grommet 1 includes a vehicle body mount portion 1a having a tapered shape and a cylindrical wire insertion portion 1b continuous with a small diameter end of the vehicle body mount portion 1a.

The size and shape of the vehicle body mount portion 1a of the grommet 1 are set such that the mount portion 1a is fitted and held in the through hole of the vehicle body panel. No problem arises when a proper or specified grommet is mounted on the wiring harness. However, when an improper or nonspecified grommet is mounted on the wiring harness, the mount portion 1a cannot be fitted and held in the through hole of the vehicle body panel. If the mounted grommet is smaller than the proper grommet, waterproof performance and other performances are reduced. On the other hand, if the mounted grommet is larger than the proper grommet, it cannot be mounted on the vehicle body panel.

Figure 14A:
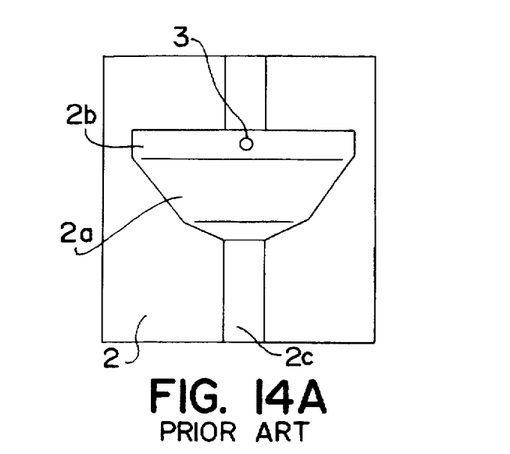
FIGS. 14(A) and 14(B) are plan and sectional views of a prior art grommet checking device.
Figure 14B:
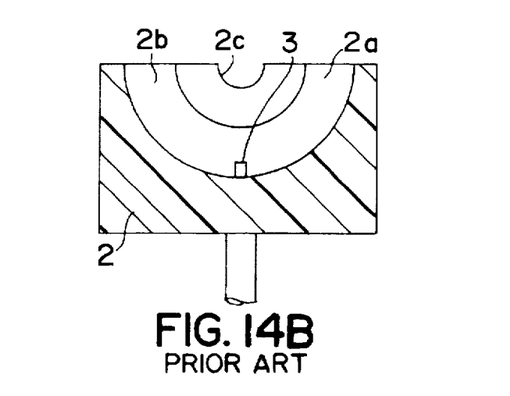

Accordingly, it is necessary to check whether or not a grommet of specified shape is mounted on the wiring harness. Checking has been conducted by the use of a checking device 2 as shown in FIGS. 14(A) and 14(B). The checking device 2 is formed with a recess acting as a grommet receptacle 2a. The shape of the grommet receptacle 2a differs depending upon the shape of the grommet 1. The grommet receptacle 2a includes a groove 2b in which the vehicle body mount portion 1a which is the lower half of the grommet 1 of specified shape is to be fitted, and a groove 2c in which the wire insertion portion 1b is to be fitted. A button 3 of a detection switch projects at the bottom surface of the groove 2b.

Figure 15:
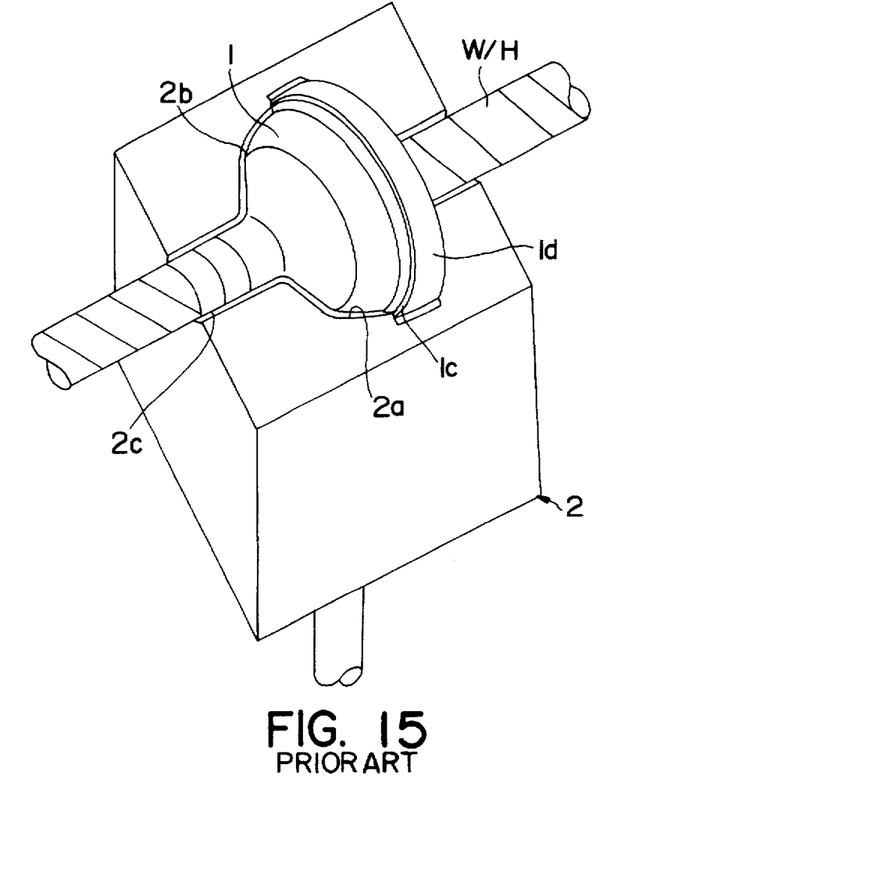
FIG. 15 is a perspective view showing a state where the grommet is fitted in the prior art checking device.
Figure 16A:
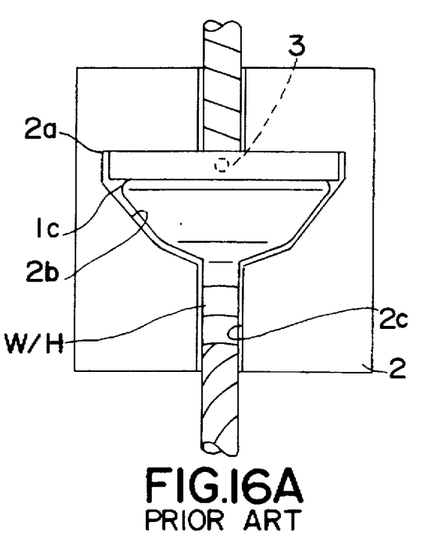
FIG. 16(A) is a plan view of FIG. 15.
Figure 16B:
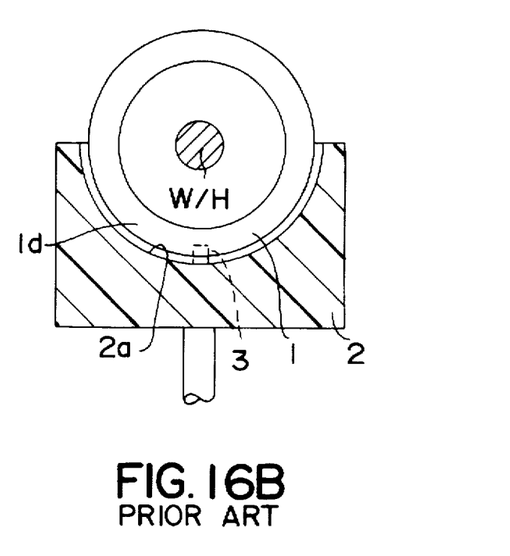

When the grommet 1 mounted with the wiring harness W/H is fitted in the grooves 2b, 2c of the receptacle 2a of the checking device 2 as shown in FIG. 15, a rim 1d of the vehicle body mount portion 1a of the grommet 1 presses the button 3 of the detection switch as shown in FIGS. 16(A) and 16(B). When a grommet 1 of nonspecified shape is fitted in the grooves 2b, 2c, the button 3 is not pressed, with the result that the mounting of the improperly shaped grommet on the wiring harness can be detected.

Figure 17A:
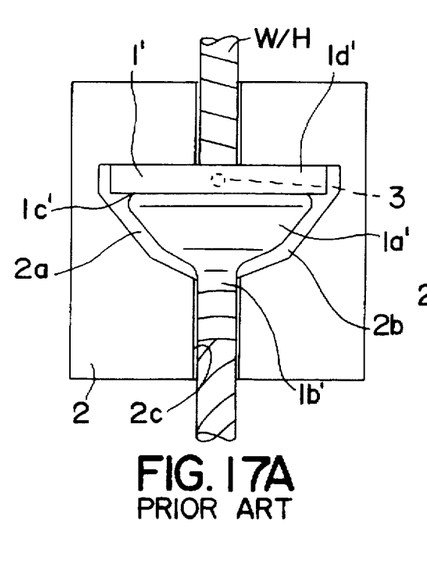
Figure 17B:
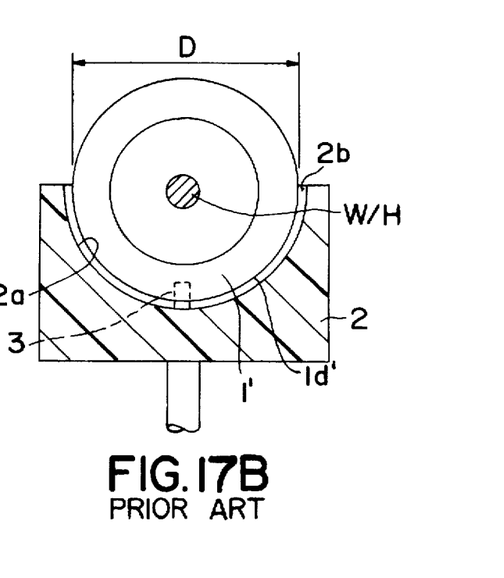

In the above checking device 2, as shown in FIGS. 17(A) and 17(B), even when a similarly shaped grommet 1' having a vehicle body mount portion 1a' whose diameter D is smaller than that of the vehicle body mount portion 1a of the specified grommet 1 is fitted in the groove 2b, the button 3 of the detection switch may be pressed upon contact of a rim 1d' of the vehicle body mount portion 1a' with the bottom surface of the groove 2b. Thus, the prior art checking device 2 may detect whether or not the grommet is mounted on the wiring harness, but cannot check whether or not the grommet 1 of specified shape is mounted.

In view of the above problem, an object of the invention is to provide a grommet and a grommet checking device for securely checking whether or not a grommet of specified shape is mounted on a wiring harness, including distinguishing amongst a plurality of kinds of grommets of different shapes, particularly having differently shaped vehicle body mount portions.

SUMMARY OF THE INVENTION

According to the invention, there is provided a grommet comprising a mount portion for mounting the grommet on an external structure, a wire insertion portion to insert a wiring harness therethrough, and at least one identifying portion of the grommet, preferably formed on an outer surface thereof. The identifying portion may be in form of a projection and/or recess on the outer surface of the grommet or may comprise an electromagnetic element e.g. a disc, a lamina or a platen imbedded in the material or laminated onto the surface of the grommet.

According to a preferred embodiment, the shape and/or location on the grommet and/or the number of the at least one identifying portion functions to identify the type, in particular size, shape, specifications, waterproofness, heatproofness, heat resistance, etc. of the grommet.

Further preferably, the identifying portion is formed in a position on the grommet different from a contact portion of the mount portion being connectable to the external structure, wherein the identifying portion preferably comprises a checking projection and/or a checking recess.

Further preferably, the identifying portion comprises a polygonal or circular flange, which may be a rim of the mount portion or which project from the rim.

According to the invention, there is further provided a grommet checking apparatus comprising: a grommet receptacle having a shape at least partly mating with the outer shape of a grommet according to the invention; and at least one identification portion for the identification of the grommet insertable into the grommet receptacle.

According to a preferred embodiment, the identification portion comprises a checking recess and/or a checking projection, in particular mating the identifying portion of the grommet insertable in the grommet receptacle.

Preferably, the grommet checking apparatus further comprises a detection means for detecting the identifying portion, in particular the checking projection and/or checking recess, of the grommet insertable in the grommet receptacle, wherein the detection means projects in particular into the identification portion, wherein the detection means preferably outputs a control signal upon engagement of the identifying portion with the identification portion.

Further preferably, the identification portion is so formed as to communicate with a mount portion fitting groove of the grommet receptacle.

According to an embodiment of the invention, the grommet comprises a large diameter vehicle body mount portion which is to be inserted into a through hole formed in a panel of a vehicle body and to be securely mounted therein; a small diameter wire insertion portion continuously formed with one end of the vehicle body mount portion to insert a wiring harness therethrough; and a checking projection formed on an outer surface of the vehicle body mount portion, the position of the checking projection differing depending upon the shape of the grommet.

The checking projection may be formed by a polygonal flange projecting from the outer periphery of the vehicle body mount portion having a circular cross section.

As is clear from the above description, by forming the checking projection in any desired position on the outer surface of the vehicle body mount portion, whether or not the grommet mount on a specified wiring harness is of specified shape can be accurately detected.

Further, according to a preferred embodiment, there is provided a grommet checking device for a grommet mounted on a wiring harness. The grommet comprises a large diameter vehicle body mount portion which is to be inserted into a through hole formed in a panel of a vehicle body and to be securely mounted therein, and a small diameter wire insertion portion continuously formed with one end of the vehicle body mount portion to insert a wiring harness therethrough. The grommet is to be fitted in a grommet receptacle of the checking device to check whether or not a grommet of specified shape is mounted. The checking device comprises a checking recess so formed as to communicate with a vehicle body mount portion fitting groove of the grommet receptacle of the checking device. A detection switch projects into the checking recess. When a grommet comprising a checking projection formed on an outer surface of the vehicle body mount portion is inserted into the grommet receptacle of the checking device, the detection switch is turned on upon engagement of the checking projection with the checking recess. The mounted grommet is detected to be nonspecified when the detection switch remains off.

The detection switch may preferably be connected with an indicator for indicating that a proper grommet is mounted on the wiring harness, when the button of the detection switch is pressed. The indicator may indicate that an improper grommet is mounted, when the switch is off.

By checking the above grommet by means of the above checking apparatus, the button of the detection switch is pressed only when the checking projection formed on the outer surface of the vehicle body mount portion of the grommet is fitted in the checking recess formed in the checking device. More specifically, the checking projection of the grommet is formed in a different position for each shape of the grommet, and the position of the checking recess of the checking device is changed so as to conform to the position of the checking projection. Accordingly, even if a grommet of nonspecified shape is fitted in the receptacle of the checking device, the mounting of the improperly shaped grommet can be securely detected since the checking projection cannot be fitted in the checking recess.

Accordingly, checking is conducted by fitting the grommet formed with the checking projection in the grommet receptacle of the checking device formed with the checking recess in a position corresponding to the position of the checking projection. Only the checking projection of the specified grommet can be fitted in the checking recess. Since the checking projection of the nonspecified grommet cannot be fitted into the checking recess, the button of the detection switch provided in the checking recess cannot be pressed. Thus, whether or not the grommet mounted on the wiring harness is of specified shape can be accurately checked.

In the case that the grommet is formed with two or more checking projections in spaced apart positions, the checking device is preferably formed with two or more checking recesses in positions corresponding to the checking projections, and the detection switch preferably projects into each corresponding checking recess.

In the case that the grommet is formed with two or more checking projections and the checking device is formed with two or more checking recesses each fitted with the button of the detection switch, even if the grommet of nonspecified shape is forcibly fitted in the grommet receptacle, all the buttons in the checking recesses are not simultaneously pressed. Thus, an erroneous mounting of the grommet can be securely detected.

Accordingly, two or more checking projections formed on the grommet are fitted in the corresponding checking recesses of the checking device. No indication is made by the indicator unless the checking projections press the buttons of all the detection switches to turn them on. Thus, whether or not the grommet is of specified shape can be more securely detected.

BRIEF DESCRIPTION OF THE DRAWINGS

FIG. 5(C) is a section of an essential portion of FIG. 5(A), FIG. 6A) is a plan view showing a state, where a grommet according to a further embodiment is fitted in a checking device, FIG. 16(B) is a section of an essential portion of FIG. 15, and FIGS. 17(A) and 17(B) are plan and sectional views showing a problem residing in the prior art checking device.

DETAILED DESCRIPTION OF THE PREFERRED EMBODIMENT

FIGS. 1 to 6 show a grommet checking device 10 according to a first embodiment of the invention. The grommet 11 includes a vehicle body mount portion 11a to be mounted on a vehicle body and a wire insertion portion 11b through which a wiring harness W/H comprising a plurality of wires is inserted. The checking device 10 is used in an apparatus for checking whether or not a grommet 11 of specified shape is mounted on a wiring harness W/H.

Figure 2:
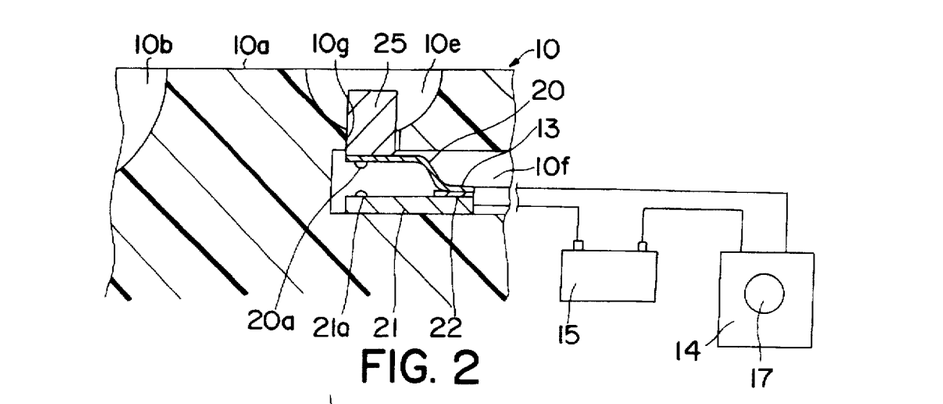
FIG. 2 is a partial section of a checking device.

In the checking apparatus, a detection switch 13 mounted in the checking device 10 and an indicator 14 including a lamp 17 (or other control devices) which is turned on when the detection switch 13 is turned on are electrically connected via a power source 15 and a wire as shown in FIG. 2.

Figure 1:
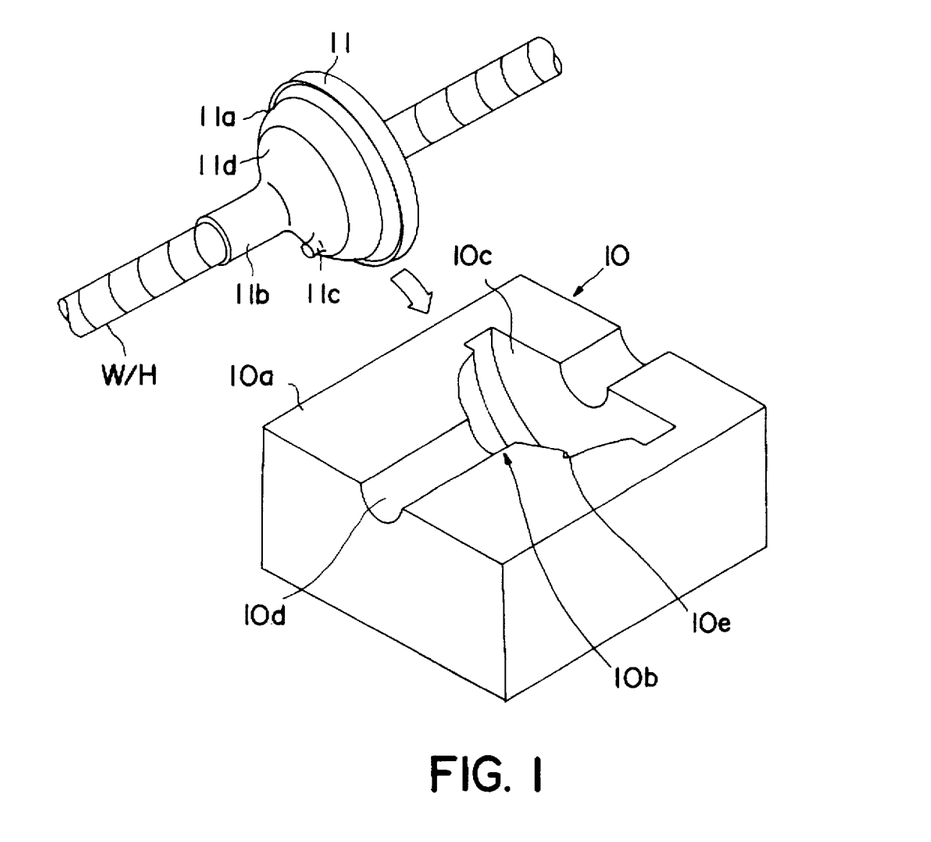
FIG. 1 is a perspective view of a grommet checking device according to a first embodiment of the invention and a grommet through which a wiring harness is inserted and which is to be fitted in the grommet checking device.
Figure 3:
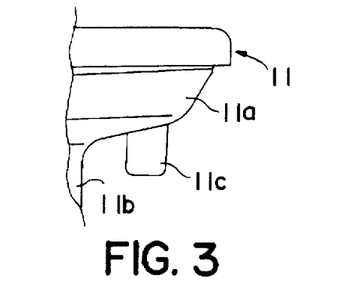
FIG. 3 is a plan view of an essential portion of the grommet.

The shape of the grommet 11 differs depending upon the size or thickness of the wiring harness inserted therethrough and the size of a through hole formed in a panel of a vehicle body in which the wiring harness is to be mounted. Particularly, the shape differs in the portion of the vehicle body mount portion 11a which is engaged with the edge of the through hole formed in the panel. A plurality of kinds of grommets 11 of different shapes are to be used. Each grommet 11 has a checking projection 11c projecting from an outer surface of the vehicle body mount portion 11a. The position of the checking projections 11c differs depending upon the shape of the grommet 11. The checking projection 11c of the first embodiment has a cylindrical shape and projects toward or extends parallel to the wire insertion portion 11b in a substantially middle position of a tapered surface 11d of the vehicle body mount portion 11a.

Figure 4A:
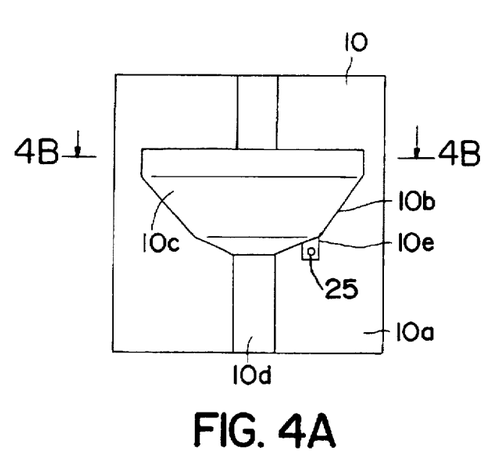
FIG. 4(A) is a plan view of the checking device.
Figure 4B:
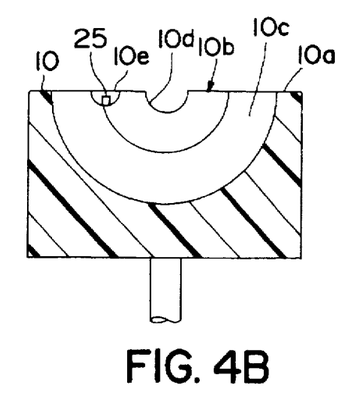
FIG. 4(B) is a cross-sectional view taken along line 4B—4B in FIG. 4(A), FIGS. 5(A) and 5(B) are plan and sectional views showing a state where a grommet of specified shape is fitted in the checking device.

On the other hand, there are a plurality of checking devices 10 corresponding to a plurality of kinds of grommets 11 of different shapes. An upper surface 10a of the checking device 10 is recessed to form a grommet receptacle 10b. The shape of the grommet receptacle 10b is in conformity with that of the grommet 11 and has a semicircular cross section. The grommet receptacle 10b includes a groove 10c in which the bottom half of the vehicle body mount portion 11a is to be fitted and a groove 10d in which the bottom half of the wire insertion portion 11b is to be fitted. The groove 10c is formed with a checking recess 10e in a position corresponding to the checking projection 11c of the grommet 11. A mount hole 10f for mounting the detection switch 13 is in communication with an inner side of the checking recess 10e as shown in FIG. 2.

The checking recess 10e has a semicylindrical shape and is formed in its bottom center with an insertion hole 10g communicating with the mount hole 10f.

As shown in FIG. 2, the detection switch 13 is such that a resilient movable contact portion 20 and a fixed contact portion 21 are connected via an insulating member 22. A button 25 is secured on the upper surface of the movable contact 20. The button 25 projects into the checking recess the through the insertion hole 10g. The movable contact portion 20 is connected with the indicator 14 via a wire, whereas the fixed contact portion 21 is connected with a power supply 15 via a wire. The power supply 15 and the indicator 14 are also connected via a wire.

Figures 5A, 5B:
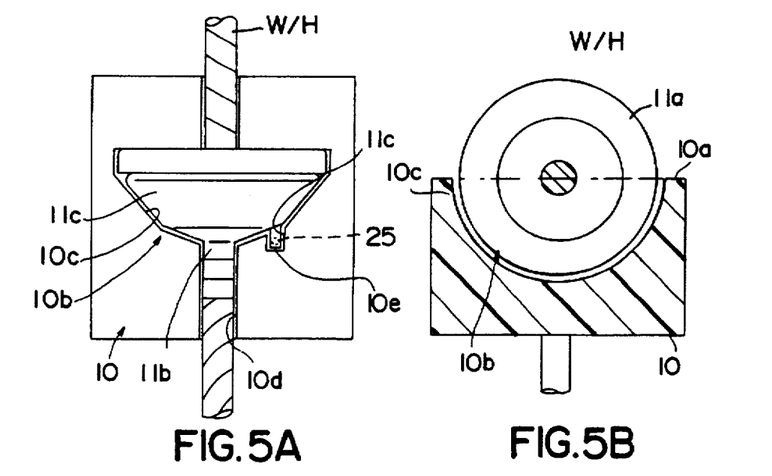
Figure 5C:
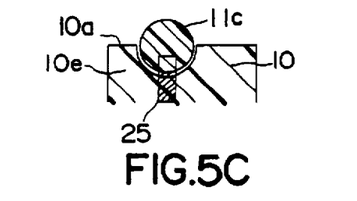

When a grommet 11 of specified shape is mounted on the wiring harness W/H to be arranged in the vehicle, upon insertion of the grommet 11 into the grommet receptacle 10b of the checking device 10, the bottom half of the grommet 11 is stably accommodated in the grommet receptacle 10b as shown in FIGS. 5(A) and 5(B) and the checking projection 11c is fitted in the checking recess 10e as shown in FIG. 5(C).

Accordingly, the checking projection 11c presses the button 25 of the detection switch 13 down, causing the movable contact portion 20 to move downwardly. Thereby, contacts 20a, 21a of the contact portions 20, 21 are brought into contact to establish an electrical connection, with the result that the lamp 17 of the indicator 14 is turned on. Thus, an operator can visually confirm that the properly shaped grommet 11 is mounted on the wiring harness W/H.

Figure 6A:
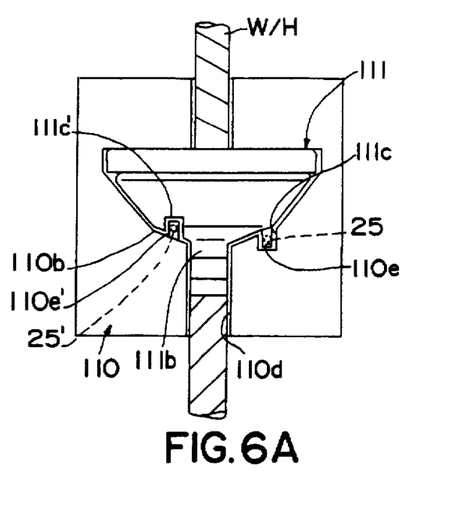

FIG. 6(A) shows a grommet 111 according to a further embodiment fitted in to the grommet receptacle 110b of the checking device 110. As in FIGS. 5(A) and 5(B) the bottom half of the grommet 111 of FIG. 6(A) is stably accommodated in the grommet receptacle 110b with the checking projection 111C of the grommet 111 fitted in the checking recess 110e of the checking device 110. A checking projection 110e' alternatively or additionally provided on the grommet checking device 110 is fitted in a checking recess 111c' alternatively or additionally provided on the grommet 111.

Accordingly, if a grommet without a recess 111c' is placed in the checking device 110 the checking projection 110e' may press down a button 25' of a detection switch corresponding to the button 25 of the embodiment shown in FIGS. 5(A) and 5(B). This will cause a movable contact portion to move downwardly. Thereby, contacts of the contact portions are brought into contact to establish an electrical connection, with the result that a lamp of the indicator 14 is turned on. Thus, an operator can visually confirm that the improperly shaped grommet 111 is mounted on the wiring harness W/H.

Figure 6B:
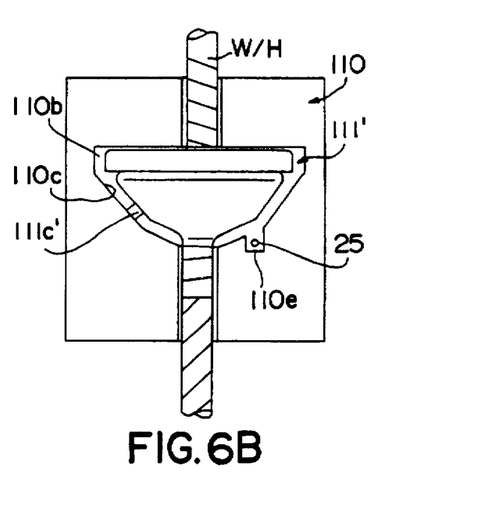
FIG. 6(B) is a plan view showing a state where a grommet of nonspecified shape is fitted in the checking device.

On the other hand, when a grommet 111' of nonspecified shape is mounted on the wiring harness W/H, the grommet 111' may be accommodated in the grommet receptacle 110b as shown in FIG. 6(B). However, since the position of a checking projection 111c' of the grommet 111' does not conform to the position of the checking recess 110e, the checking projection 111c' cannot press the button 25 of the detection switch 13. Accordingly, the lamp 17 of the indicator 14 is not turned on and the operator can visually conform that the improperly shaped grommet 111' is mounted on the wiring harness W/H.

Figure 7A:
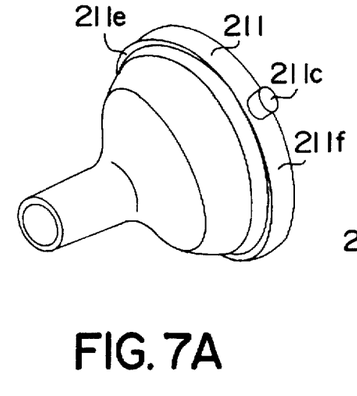
FIGS. 7(A) and 7(B) show a modification of the first embodiment, FIG. 7(A) being a perspective view of the grommet and FIG. 7(B) a section of the checking device.
Figure 7B:
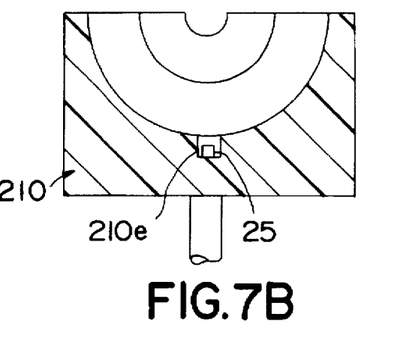
Figure 8A:
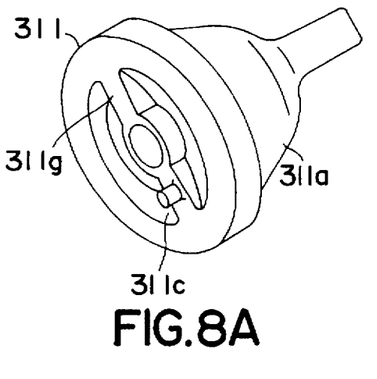
FIGS. 8(A) and 8(B) show another modification of the first embodiment, FIG. 8(A) being a perspective view of the grommet and FIG. 8(B) a section of the checking device.
Figure 8B:
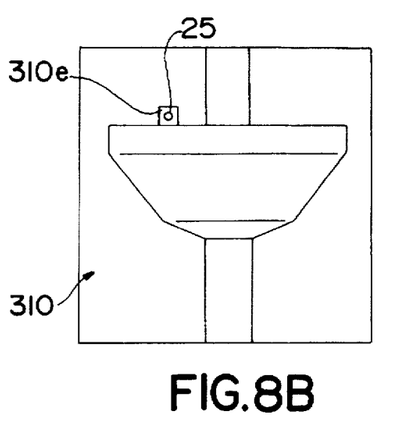
Figure 9A:
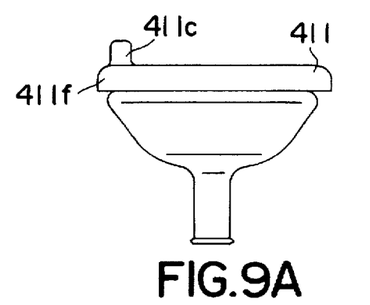
FIGS. 9(A) and 9(B) show still another modification of the first embodiment, FIG. 9(A) being a perspective view of the grommet and FIG. 9(B) a section of the checking device.
Figure 9B:
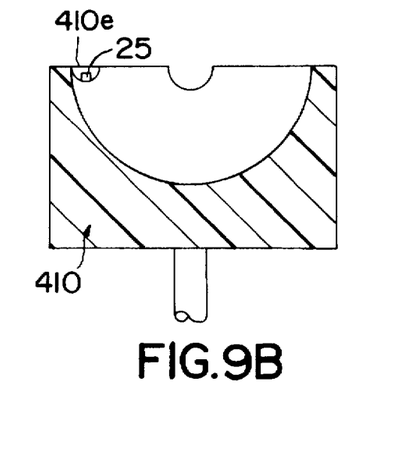

FIGS. 7 to 9 show modifications of the first embodiment.

In a modification shown in FIGS. 7(A) and 7(B), the checking projection 211c of a grommet 211 radially projects from a rim 211f on the outside of an engaging groove 211e to be engaged with the panel of the vehicle body. Further, the checking recess 210e of the checking device 210 is formed in such a position as to face the checking projection 211c, and the button 25 of the detection switch 13 projects into the checking recess 210e.

In a modification shown in FIGS. 8(A) and 8(B), the grommet 311 is formed with a reinforcing rib 311g inside the vehicle body mount portion 311a, and the checking projection 311c projects outward from the end face of the rib 311g. On the other hand, the checking recess 310e of the checking device 10 is formed in such a position as to face the checking projection 311c. The button 25 of the detection switch 13 projects into the checking recess 310e.

In a modification shown in FIGS. 9(A) and 9(B), the checking projection 411c of the grommet 411 projects outward from the end face of the rim 411f, and the checking recess 410e is formed in the upper surface of the checking device 410.

The modifications are not limited to the above, but any modification is possible as long as the checking projection projects from the outer surface of the vehicle body mount portion of the grommet other than from a lip of the end face of the rim on the side of the engaging groove. If the checking projection is formed on the lip, the vehicle body mount portion cannot be mounted in close contact with the edge of the through hole formed in the panel of the vehicle body, thereby damaging a waterproof performance.

Figure 10A:
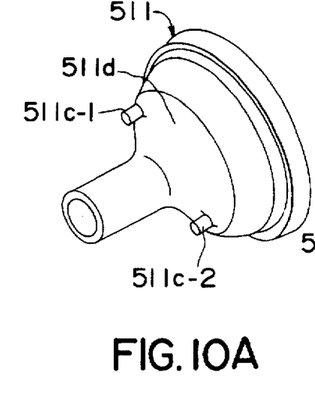
FIGS. 10(A) and 10(B) show a second embodiment, FIG. 10(A) being a perspective view of a grommet and FIG. 10(B) a section of a checking device.
Figure 10B:
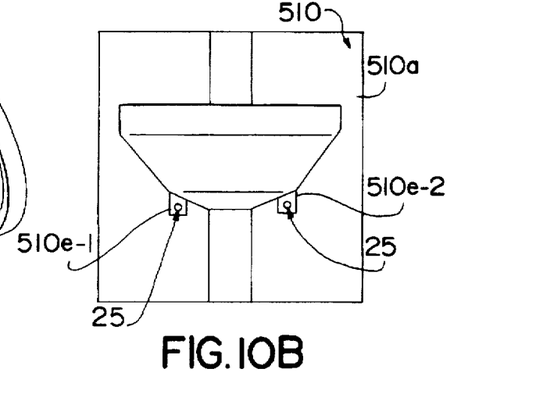

FIGS. 10(A) and 10(B) show a grommet 511 and a grommet checking device 510 according to a second embodiment. In the second embodiment, two each of checking projections 511c-1, 511c-2 and checking recesses 510e-1, 510e-2 are formed in the grommet 511 and the checking device 510, respectively.

Checking projections 511c-1, 511c-2 project from a substantially middle portion of a tapered surface 511d of the grommet 511 such that they are opposed to each other in a radius direction of the grommet 511.

Checking recesses 510e-1, 510e-2 are formed in an upper surface 510a of the checking device 510. Similar to the first embodiment, a button 25 projecting from a movable contact portion 20 of a detection switch 13 projects into the corresponding one of the checking recesses 510e-1, 510e-2. A lamp 17 of an indicator 14 is turned on when two detection switches 13 are both turned on.

In the second embodiment, even if an improperly shaped grommet is forcibly fitted in a grommet receptacle 510b, the checking projections cannot be fitted in the checking recesses 510e-1, 510e-2. Thus, an erroneous mounting of a grommet can be more securely detected.

Figures 11A, 11B:
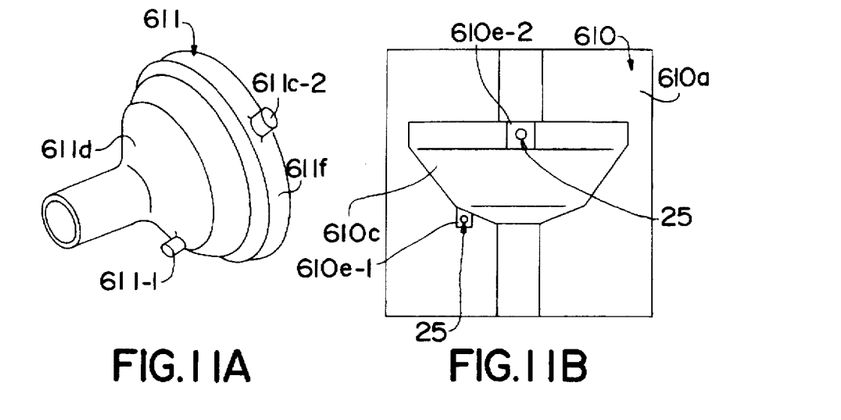
FIGS. 11(A) and 11(B) show a modification of the second embodiment, FIG. 11(A) being a perspective view of the grommet and FIG. 11(B) a section of the checking device.

FIGS. 11(A) and 11(B) show a modification of the second embodiment. One checking projection 611c-1 of the grommet 611 projects from a substantially middle portion of the tapered surface 611d, whereas the other checking projection 611c-2 projects from the outer circumferential surface of the rim 611f. In this modification, the checking projections 611c-1, 611c-2 are displaced by 45° in a circumferential direction. Further, the checking recess 610e-1 corresponding to the checking projection 611c-1 is formed in the upper surface 610a of the checking device 610, and the checking recess 610e-2 corresponding to the checking projection 611c-2 is formed at the bottom of the grommet receptacle 610c.

As mentioned above, it is only required that the two checking projections 611c-1, 611c-2 project from the other surface of the grommet 611 other than the lip. A variety of combinations of checking projections can be formed. Further, three or more checking projections may be formed.

Figures 12A, 12B:
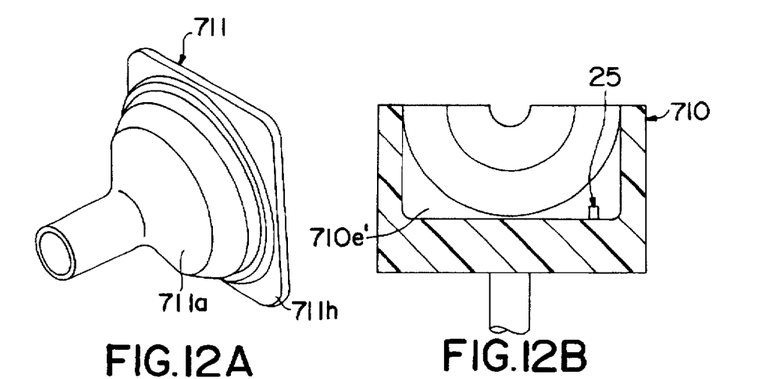
FIGS. 12(A) and 12(B) show a second embodiment, FIG. 12(A) being a perspective view of a grommet and FIG. 12(B) a section of a checking device.

FIGS. 12(A) and 12(B) show a grommet 711 and a grommet checking device 710 according to a third embodiment. The grommet 711 is provided with a polygonal flange 711h projecting outward from the outer periphery of a vehicle body mount portion 711a. A plurality of portions of the flange 711h projecting from the outer periphery of the vehicle body mount portion 711a act as checking projections. In this embodiment, the flange 711h has a rectangular shape. Each checking recess 710e' of the checking device 710 is formed such that its bottom end is a horizontal surface. A button 25 projecting from a detection switch 13 project into the projection recess 710e' in the vicinity of a right end as shown in FIG. 12(B).

In the third embodiment, a plurality of projections are simply formed by the projected portions of the polygonal flange 711h. Accordingly, the shape of molds for forming the grommet 711 and the checking device 710 can be simplified, with the result that the a cost for molds can be reduced.

What is claimed is:

1. A grommet for sealed passage of a wire harness through a hole in a panel, said grommet having opposed first and second ends and comprising:

a substantially tubular wire insertion portion (11b) extending from the first end of the grommet to a location between said first and second ends;

a tapered mount portion (11a) having a small diameter end at said wire insertion portion (11b) and a large diameter end between the wire insertion portion (11b) and the second end of the grommet, said large diameter end of said mount portion (11a) defining an outside diameter for sealed engagement with the panel at the hole therethrough;

an annular rim (11f) extending from the large diameter end of the tapered mount portion (11a) to the second end of the grommet and having an outer circumferential surface disposed radially outwardly from the large diameter end of the tapered mount portion (11a), the annular rim (11f) including a diametrically disposed support rib (11g) extending thereacross; and at least one identifying portion (11c) formed on and projecting from the rib (11g) and protecting substantially perpendicular to said rib (11g) and away from said first end.

2. A grommet according to claim 1, wherein the wire insertion portion (11b) is concentrically defined around a longitudinal axis, the at least one identifying portion (11c) extends substantially parallel to the longitudinal axis of the wire insertion portion (11b).

3. A grommet for sealed passage of a wire harness through a hole in a panel, said grommet having opposed first and second ends and comprising:

a substantially tubular wire insertion portion (11b) extending from the first end of the grommet to a location between said first and second ends;

a tapered mount portion (11a) having a small diameter end at said wire insertion portion (11b) and a large diameter end between the wire insertion portion (11b) and the second end of the grommet, said large diameter end of said mount portion (11a) defining an outside diameter for sealed engagement with the panel at the hole therethrough;

an annular rim (11f) extending from the large diameter end of the tapered mount portion (11a) to the second end of the grommet and having an outer circumferential surface disposed radially outwardly from the large diameter end of the tapered mount portion (11a); and at least one identifying portion (11c) formed on and projecting from the rim (11f), the identifying portion being a planar flange (11h) of polygonal shape disposed at the second end of the grommet (11) and extending outwardly from the rim (11f).

* * * * *